United States Patent
Jang et al.

(10) Patent No.: US 9,270,165 B2
(45) Date of Patent: Feb. 23, 2016

(54) PHASE SHIFT CIRCUIT AND POWER FACTOR CORRECTION CIRCUIT INCLUDING THE SAME

(71) Applicants: SAMSUNG ELECTRO-MECHANICS CO., LTD., Suwon, Gyunggi-do (KR); University of Seoul Industry Cooperation Foundation, Seoul (KR)

(72) Inventors: Yu Jin Jang, Gyunggi-do (KR); Hwan Cho, Gyunggi-do (KR); Yong Seong Roh, Incheon (KR); Young Jin Moon, Gwangju (KR); Jeong Pyo Park, Gyeonggi-do (KR); Joong Ho Choi, Gyeonggi-do (KR); Jeong Mo Yang, Gyunggi-do (KR); Chang Sik Yoo, Seoul (KR)

(73) Assignees: SAMSUNG ELECTRO-MECHANICS CO., LTD., Suwon-Si, Gyeonggi-Do (KR); University of Seoul Industry Cooperation Foundation, Seoul (KR)

( * ) Notice: Subject to any disclaimer, the term of this patent is extended or adjusted under 35 U.S.C. 154(b) by 224 days.

(21) Appl. No.: 13/892,033

(22) Filed: May 10, 2013

(65) Prior Publication Data
US 2014/0177295 A1 Jun. 26, 2014

(30) Foreign Application Priority Data
Dec. 21, 2012 (KR) .......................... 10-2012-0151303

(51) Int. Cl.
*H02M 1/42* (2007.01)
*H02M 1/14* (2006.01)
*H02M 3/158* (2006.01)

(52) U.S. Cl.
CPC .............. *H02M 1/4225* (2013.01); *H02M 1/14* (2013.01); *H02M 3/1584* (2013.01); *H02M 2001/4291* (2013.01); *H02M 2003/1586* (2013.01); *Y02B 70/126* (2013.01)

(58) Field of Classification Search
CPC ....... H02M 1/14; H02M 1/42; H02M 1/4225; H02M 3/1584; H02M 2003/1586
See application file for complete search history.

(56) References Cited

U.S. PATENT DOCUMENTS

2005/0001597 A1* 1/2005 Walters ................... H02J 1/102
323/222
2007/0247121 A1* 10/2007 Wu et al. ....................... 323/222
(Continued)

FOREIGN PATENT DOCUMENTS

| EP | 2086095 A1 | 8/2009 |
| KR | 2009-0088227 A | 8/2009 |
| KR | 2009-0105229 A | 10/2009 |

OTHER PUBLICATIONS

Korean Office Action with full English Translation issued in Korean Patent Application No. 10-2012-0151303 mail date Dec. 18, 2013.

*Primary Examiner* — Fred E Finch, III
(74) *Attorney, Agent, or Firm* — McDermott Will & Emery LLP

(57) ABSTRACT

There are provided a phase shift circuit and a power factor correction circuit including the same. The phase shift circuit includes a switching circuit unit charging power in or discharging power from a capacitor through a plurality of switching devices and comparing a voltage of the capacitor with a predetermined reference voltage, and a clock generating unit generating a reference clock signal based on an output of the switching circuit unit, wherein the switching circuit unit turns the plurality of switching devices on or off, based on currents from inductors respectively included in a main circuit and a sub-circuit of a power factor correction circuit to determine a polarity of the voltage of the capacitor.

12 Claims, 6 Drawing Sheets

(56) References Cited

U.S. PATENT DOCUMENTS

| | | |
|---|---|---|
| 2009/0206809 A1 | 8/2009 | Koo et al. |
| 2009/0257257 A1* | 10/2009 | Adragna et al. ............... 363/65 |
| 2010/0097041 A1* | 4/2010 | Ayukawa et al. ............. 323/272 |
| 2011/0043177 A1* | 2/2011 | Chen et al. ................... 323/283 |
| 2012/0262958 A1* | 10/2012 | Feldtkeller et al. ............. 363/44 |
| 2014/0176089 A1* | 6/2014 | Yang et al. ................... 323/207 |

* cited by examiner

PHASE SHIFT CIRCUIT AND POWER FACTOR CORRECTION CIRCUIT INCLUDING THE SAME

CROSS-REFERENCE TO RELATED APPLICATIONS

This application claims the priority of Korean Patent Application No. 10-2012-0151303 filed on Dec. 21, 2012, in the Korean Intellectual Property Office, the disclosure of which is incorporated herein by reference.

BACKGROUND OF THE INVENTION

1. Field of the Invention

The present invention relates to a phase shift circuit capable of significantly decreasing an electromagnetic interference (EMI) component of an input/output signal by adjusting a phase difference between driving signals of switches operating a main circuit and a sub-circuit included in a power factor correction circuit, and a power factor correction circuit including the same.

2. Description of the Related Art

Recently, in the electrical appliance and electronic device fields, research into a method of removing harmonic components generated in an input terminal of an electronic apparatus in order to significantly decrease an effect on a power line of an electrical appliance or electronic device and reduce interference with other appliances and devices has been actively undertaken. As an efficient method of removing harmonic components, a power factor correction (PFC) circuit may be used. A power factor correction circuit may be classified as a passive-type power factor correction circuit or an active-type power factor correction circuit, according to whether or not it includes a switch. The passive-type power factor correction circuit has disadvantages in that a form factor thereof may be large, and an effect thereof may not be great. Therefore, recently, active-type power factor correction circuits have been widely used.

Among active-type power factor correction circuits, an interleaving-type power factor correction circuit using at least two identical power factor correction circuits connected to each other in parallel has characteristics that depend on a phase difference between signals for operating a plurality of circuits connected to each other in parallel. For example, when it is assumed that two identical power factor correction circuits are connected to each other in parallel in a master-slave scheme, in the case in which driving signals for operating switches respectively included in the two identical power factor correction circuits have a phase difference of 180 degrees therebetween, an electromagnetic interference (EMI) component of an input/output signal may be significantly decreased. When the phase difference between the driving signals for a main circuit and a sub-circuit deviates from 180 degrees, a ripple component of an input current increases, such that an EMI component increases.

In the interleaving-type power factor correction circuit, various type phase shift circuits have been suggested in order to maintain a phase difference between switching devices included in respective circuits at a required value. However, in the phase shift circuit suggested in the related art, a selection condition in selecting a current source included in the circuit was limited or it was difficult to accurately generate a required phase difference.

In the following Related Art Documents, Patent Document 1, which relates to an interleaved-type switching converter, and an apparatus and method of controlling the same, discloses a method of switching power in an interleaving scheme to generate a control signal and maintaining a phase difference at a required value, for example, 180 degrees. Patent Document 2, which relates to a phase shift and synchronization circuit, discloses a feature of adjusting a sink between control signals of the respective switching devices in an interleaving-type power factor correction circuit. However, neither Patent Document 1 nor Patent Document 2 discloses a feature of changing a polarity of a voltage of a capacitor in a circuit controlling a phase difference to operate a switch at a required phase difference.

RELATED ART DOCUMENT (Patent Document 1) Korean Patent Laid-Open Publication No. 10-2009-0088227
(Patent Document 2) European Patent Laid-Open Publication No. 2086095 A1

SUMMARY OF THE INVENTION

An aspect of the present invention provides a phase shift circuit capable of decreasing a phase difference due to change in process, voltage, and temperature (PVT) conditions and a mismatch in a process by controlling switches of respective main circuit and sub-circuit included in a power factor correction circuit to have a required phase difference therebetween and controlling a phase difference between driving signals for operating switches of the main circuit and the sub-circuit according to a polarity of a voltage of a capacitor changed in a positive (+) or negative (−) direction, based on a predetermined voltage, and a power factor correction circuit including the same.

According to an aspect of the present invention, there is provided a phase shift circuit including: a switching circuit unit charging power in or discharging power from a capacitor through a plurality of switching devices and comparing a voltage of the capacitor with a predetermined reference voltage; and a clock generating unit generating a reference clock signal based on an output of the switching circuit unit, wherein the switching circuit unit turns the plurality of switching devices on or off based on currents from inductors respectively included in a main circuit and a sub-circuit of a power factor correction circuit to determine a polarity of the voltage of the capacitor.

The plurality of switching devices may include first and second switch groups having different operational timings, and a polarity of the voltage of the capacitor when the first switch group is turned on may be different from a polarity of the voltage of the capacitor when the second switch group is turned on.

The switching circuit unit may include: at least one current source supplying charges to the capacitor; and at least one voltage source generating a voltage having the same level as that of the reference voltage.

The phase shift circuit may further include a detection circuit unit detecting the currents of the inductors respectively included in the main circuit and the sub-circuit, wherein the switching circuit unit determines operations of the plurality of switching devices based on an output of the detection circuit unit.

The clock generating unit may generate the reference clock signal so as to have a phase difference of 180 degrees from a voltage pulse signal corresponding to the current of the inductor included in the main circuit.

The detection circuit unit may detect the currents of the inductors by a zero-crossing method.

The phase shift circuit may further include a control circuit unit generating a control signal based on a voltage signal corresponding to the current of the inductor included in the sub-circuit and the reference clock signal, wherein the control circuit unit determines a level of the control signal by using a phase difference between the voltage signal corresponding to the current of the inductor included in the sub-circuit and the reference clock signal.

According to another aspect of the present invention, there is provided a power factor correction circuit including: a detection circuit unit detecting currents from inductors respectively included in a main circuit and a sub-circuit to generate a voltage pulse signal; a controlling unit generating a control signal based on the voltage pulse signal; and a driving circuit unit determining operations of switches respectively included in the main circuit and the sub-circuit, based on the control signal and the voltage pulse signal, wherein the controlling unit generates the control signal to allow driving signals for respectively operating the switch included in the main circuit and the switch included in the sub-circuit to have a phase difference therebetween so as to allow electromagnetic interference (EMI) to be significantly decreased.

The controlling unit may include: a phase shift circuit including a capacitor in or from which power is charged or discharged through a plurality of switching devices, and a clock generating circuit generating a reference clock signal by using a voltage of the capacitor; and a control signal generating circuit determining a level of the control signal based on the reference clock signal and the voltage pulse signal, the plurality of respective switching devices being turned on or turned off by the voltage pulse signal to determine a polarity of the voltage of the capacitor.

The control signal generating circuit may determine the level of the control signal from a phase difference between the reference clock signal and the voltage pulse signal.

The control signal generating circuit may raise the level of the control signal when a phase of the voltage pulse signal generated from the current of the inductor included in the sub-circuit leads a phase of the reference clock signal, and may lower the level of the control signal when the phase of the voltage pulse signal generated from the current of the inductor included in the sub-circuit lags behind the phase of the reference clock signal.

The clock generating circuit may generate the reference clock signal so as to have a phase difference of 180 degrees from the voltage pulse signal generated from the current of the inductor included in the main circuit.

The detection circuit unit may generate the voltage pulse signal by a zero-crossing method.

The driving circuit unit may include: a ramp generating unit generating a first ramp signal having a fixed gradient and a second ramp signal having a variable gradient from the control signal; a comparing circuit unit comparing the first and second ramp signals with a predetermined reference signal; and a flip-flop generating driving signals for the switches included in the main circuit and the sub-circuit, based on an output of the comparing circuit unit and the voltage pulse signal.

The comparing circuit unit may compare an output signal of at least one of the main circuit and the sub-circuit with a band gap reference (BGR) signal to generate the reference signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Figure 1:
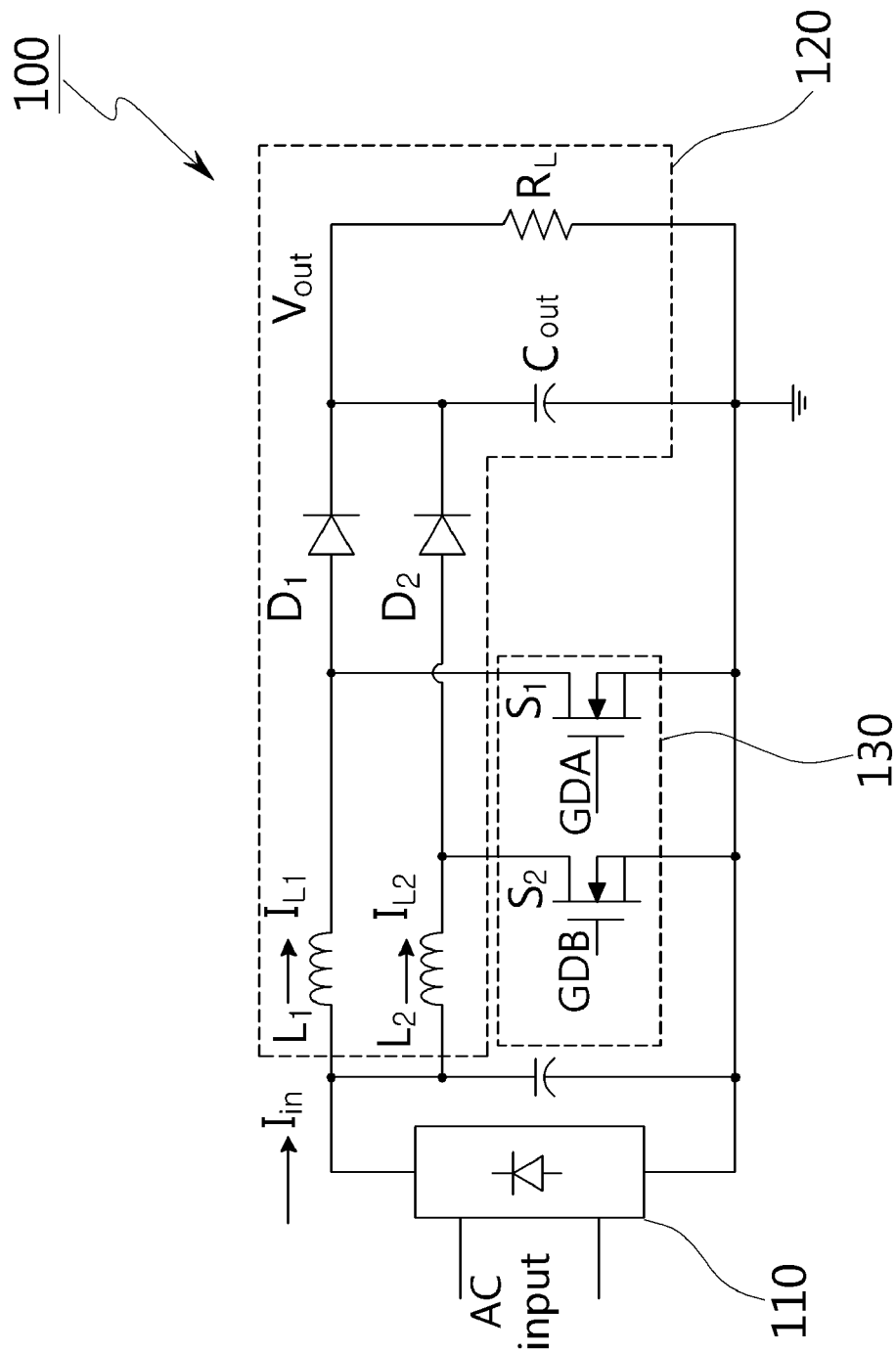
FIG. 1 is a schematic circuit diagram illustrating a power factor correction circuit according to an embodiment of the present invention.

FIG. 1 is a schematic circuit diagram illustrating a power factor correction circuit according to an embodiment of the present invention.

Referring to FIG. 1, the power factor correction (PFC) circuit 100 according to the present embodiment may include a rectifying unit 110 receiving and rectifying alternating current (AC) power, a power factor correcting unit 120 including inductors $L_1$ and $L_2$ connected to each other in parallel, a resistor $R_L$, and a capacitor $C1_{OUT}$, and a switch unit 130 controlling an operation of circuits connected to each other in parallel. The switch unit 130 may control a current flowing in the inductors $L_1$ and $L_2$, and switching devices $S_1$ and $S_2$ may be turned on or turned off by gate driving signals GDA and GDB, respectively.

Although FIG. 1 shows only one resistor $R_L$ and one capacitor $C1_{OUT}$ for convenience, each of the resistor and the capacitor may also be classified as two devices connected to each other in parallel, similar to the inductors $L_1$ and $L_2$. That is, the power factor correction circuit 100 shown in FIG. 1 may be an interleaving power factor correction circuit in which two same circuits are connected to each other in parallel in a master-slave scheme. In this case, when the gate driving signals GDA and GDB controlling operations of the respective circuits have a phase difference of 360/2 degrees, that is, 180 degrees therebetween, a ripple component of an input current $I_{in}$ may be significantly decreased, and an EMI component thereof may be decreased.

In order to significantly decrease the ripple component and the EMI component of the input current $I_{in}$, the power factor correction circuit 100 may include a phase shift circuit provided in a controlling unit generating the gate driving signals GDA and GDB. The phase shift circuit may allow the phase difference between the gate driving signals GDA and GDB to be maintained as 180 degrees. To this end, the phase shift circuit may receive voltages converted from currents respectively flowing in the inductors $L_1$ and $L_2$. Hereinafter, a circuit configuration capable of setting the phase difference between the gate driving signals GDA and GDB to a required value and an operational method thereof will be described with reference to FIGS. 2 through 6.

Figure 2:
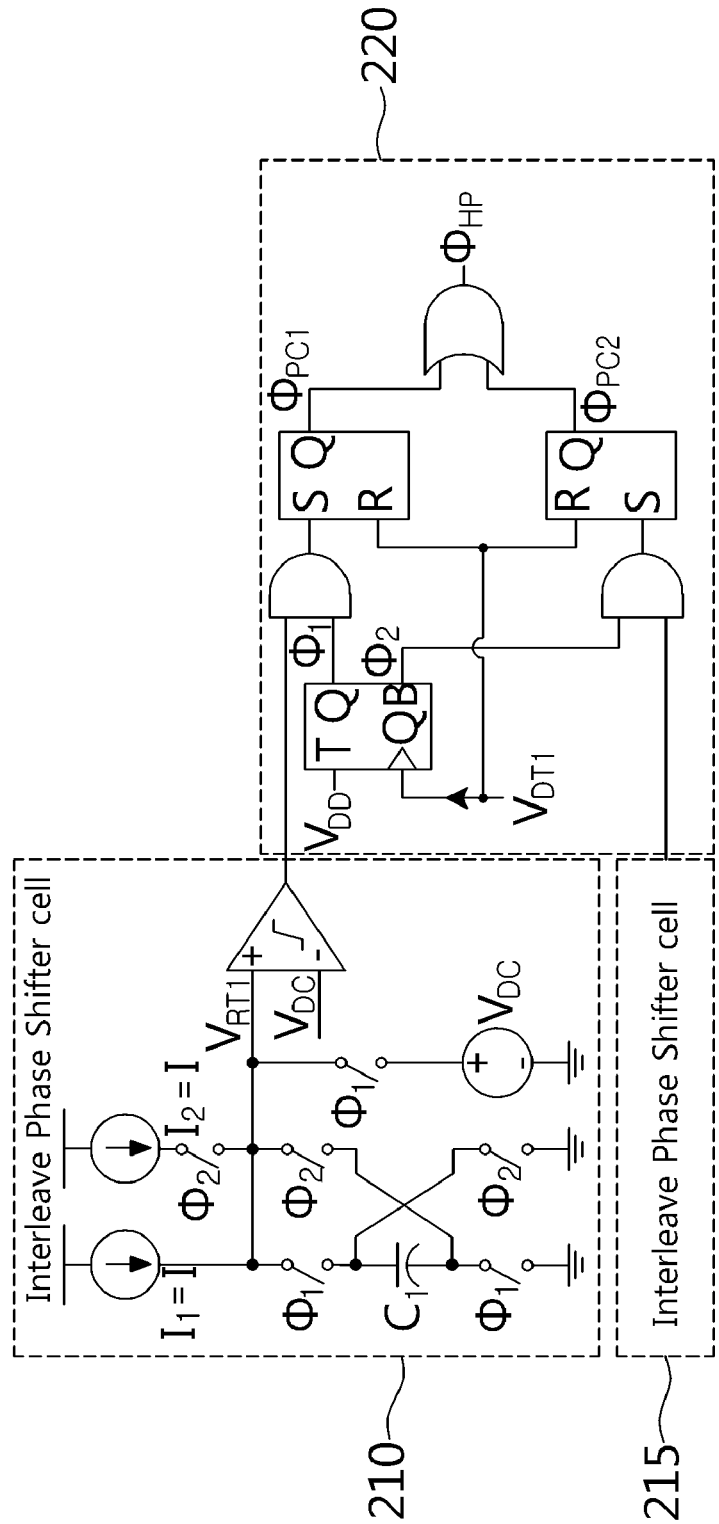
FIG. 2 is a circuit diagram illustrating an example of a phase shift circuit according to the embodiment of the present invention.

FIG. 2 is a circuit diagram illustrating an example of a phase shift circuit according to the embodiment of the present invention.

Referring to FIG. 2, the phase shift circuit 200 according to the present embodiment may include switching circuit units 210 and 215 including at least one power supply, a plurality of switching devices, a capacitor, a comparator, and the like, and a clock generating unit 220 generating a reference clock signal $\phi_{HP}$. An operation of the phase shift circuit 200 will first be described with reference to FIGS. 2 and 3, and a circuit and a method for adjusting a phase difference between gate driving signals GDA and GDB from the reference clock signal $\phi_{HP}$ outputted by the phase shift circuit 200 will be described below with reference to FIGS. 4 and 5.

The plurality of switching devices included in the switching circuit units 210 and 215 in FIG. 2 may be classified as a first switch group of which turning on and turning off are controlled by a first control signal $\phi_1$ and a second switch group of which turning on and turning off are controlled by a second control signal $\phi_2$. The first and second control signals $\phi_1$ and $\phi_2$ may be signals generated by the currents flowing in the inductors $L_1$ and $L_2$ of the power factor correction circuit 100. For example, the currents flowing in the inductors $L_1$ and $L_2$ are detected, and voltage pulse signals $V_{DT1}$ and $V_{DT2}$ of which a pulse is generated at the time at which the detected current becomes 0 are generated. Levels of the first and second control signals $\phi_1$ and $\phi_2$ are determined according to operations of the voltage pulse signals $V_{DT1}$ and $V_{DT2}$, and the turning on and turning off of the first and second switch groups are determined according to the levels of the first and second control signals.

The comparator included in the switching circuit unit 210 may compare a voltage signal $V_{RT1}$ corresponding to a voltage of a capacitor C1 with a reference voltage $V_{DC}$ and output an output signal. As shown in FIG. 2, two switching circuit units 210 and 215 may be provided, and outputs of the respective switching circuit units 210 and 215 may be applied to AND gates included in the clock generating unit 220 as input signals. The AND gates may be used to compare the output signals of the respective switching circuit units 210 and 215 with the first and second control signals $\phi_1$ and $\phi_2$ and apply a comparison result together with $V_{DT1}$ to RS flip-flops, thereby generating the reference clock signal $\phi_{HP}$.

Hereinafter, a detailed operation of the phase shift circuit 200 shown in FIG. 2 will be described with reference to both of FIG. 2 and a timing diagram of FIG. 3.

Figure 3:
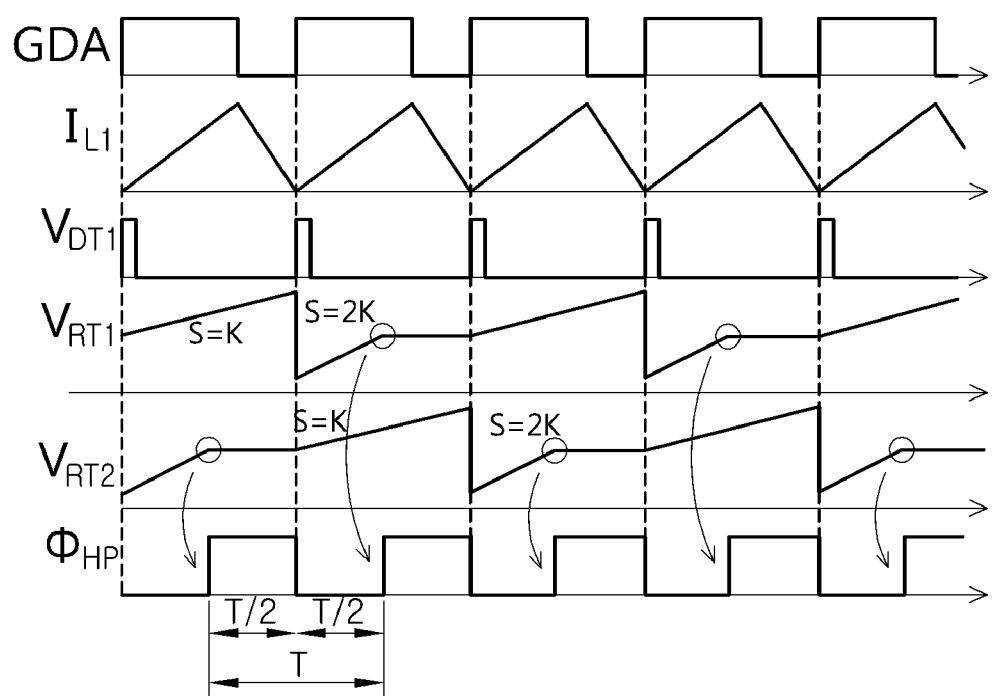
FIG. 3 is a timing diagram for describing an operation of the phase shift circuit shown in FIG. 2.

Referring to FIG. 3, a gate driving signal GDA having a predetermined period is shown. Hereinafter, for convenience of explanation, it will be assumed that a power factor correction circuit operated by the gate driving signal GDA is a main circuit in a master scheme and a power factor correction circuit operated by the gate driving signal GDB is a sub-circuit in a slave scheme. The main circuit of which an operation is controlled by the gate driving signal GDA may perform a free-running operation regardless of an operation of the sub-circuit in the slave scheme.

First, in a section in which the gate driving signal GDA has a high level, a current $I_{L1}$ of the inductor $L_1$ is gradually increased by the input current $I_{in}$ according to an AC input signal. In this case, when the first control signal $\phi_1$ has a high level, sufficient to turn the first switch group on, the voltage $V_{RT1}$ of the capacitor C1 is charged by a current source $I_1$ based on the reference voltage $V_{DC}$.

Therefore, since the voltage $V_{RT1}$ of the capacitor C1 is higher than the reference voltage $V_{DC}$, the comparator of the first switching circuit unit 210 outputs an output signal having a high level. On the other hand, the second switching circuit unit 215 operated as opposed to the first switching circuit unit 210 outputs an output signal having a low level. As a result, both of two AND gates included in the clock generating unit output a signal having a low level, such that the reference clock signal $\phi_{HP}$ has a low level.

When a voltage $V_{RT2}$ of a capacitor C2 (not shown) included in the second switching circuit unit 215 rises up to the reference voltage $V_{DC}$ as shown in FIG. 3 during a time in which the voltage $V_{RT1}$ of the capacitor C1 is maintained as a value higher than the reference voltage $V_{DC}$, the second switching circuit unit 215 outputs an output signal having a high level. At the time, since the first control signal $\phi_1$ is in a state in which it is maintained at the high level, a lower AND gate of the clock generating unit 220 outputs a signal having a high level, such that the reference clock signal $\phi_{HP}$ is triggered to have a high level.

Then, when a level of the gate driving signal GDA is changed to a low level and the current $I_{L1}$ of the inductor $L_1$ is decreased to reach 0, a pulse is again generated in $V_{DT1}$, such that a level of the first control signal $\phi_1$ is changed to a low level and a level of the second control signal $\phi_2$ is changed to a high level. Therefore, a polarity of a voltage of the capacitor C1 in the switching circuit units 210 and 215 is reversed, and current sources $I_1$ and $I_2$ simultaneously supply a current 2I to the capacitor C1.

As a result, when a pulse of $V_{DT1}$ is generated, the voltage $V_{RT1}$ of the capacitor C1 has an instantaneously changed polarity and is increased at a very high speed, specifically, at a gradient two times higher than that of the previous period to be equal to $V_{DC}$. On the other hand, $V_{DT2}$ is slowly increased from the reference voltage $V_{DC}$ while illustrating a tendency to be the same as that of $V_{DT1}$ of the previous period. At a timing at which the pulse of $V_{DT1}$ is generated, since the $V_{RT1}$ has a value smaller than $V_{DC}$, that is, the polarity thereof is changed, the first switching circuit unit 210 outputs a signal having a low level. In addition, the second switching circuit unit 215 continuously outputs the signal having the high level.

When the pulse is re-generated in $V_{DT1}$, since the level of the first control signal $\phi_1$ is changed to the low level and the level of the second control signal $\phi_2$ is changed to the high level as described above, both of the AND gates of the clock generating unit 220 output signals having a low level. Therefore, both of output signals of the RS flip-flops also have a low level, and the reference clock signal $\phi_{HP}$ is triggered from a high level to a low level.

When the capacitor C1 simultaneously receives the currents supplied from the current sources $I_1$ and $I_2$, such that the voltage $V_{RT1}$ of the capacitor C1 is rapidly increased to reach the reference voltage $V_{DC}$, the comparator of the first switching circuit unit 210 outputs the signal having the high level, such that an upper AND gate of the clock generating unit 220 outputs a signal having a high level. Therefore, an output signal of an upper RS flip-flop is triggered to a high level, and the reference clock signal $\phi_{HP}$ is triggered from a low level to a high level. The phase shift circuit 200 according to the embodiment of the present invention may repeat the above-mentioned operation to generate the reference clock signal $\phi_{HP}$.

Although not shown in FIG. 2, the reference clock signal $\phi_{HP}$ may be transferred to a control circuit unit connected to the phase shift circuit 200. The control circuit unit may generate a predetermined control signal using the reference clock signal $\phi_{HP}$ and the voltage pulse signals $V_{DT1}$ and $V_{DT2}$ corresponding to the currents detected from the inductors $L_1$ and $L_2$. The control signal generated by the control circuit unit may have a voltage signal form and have a level determined by the reference clock signal $\phi_{HP}$ and the voltage pulse signal $V_{DT2}$. Next, a description thereof will be provided with reference to FIG. 4.

Figure 4:
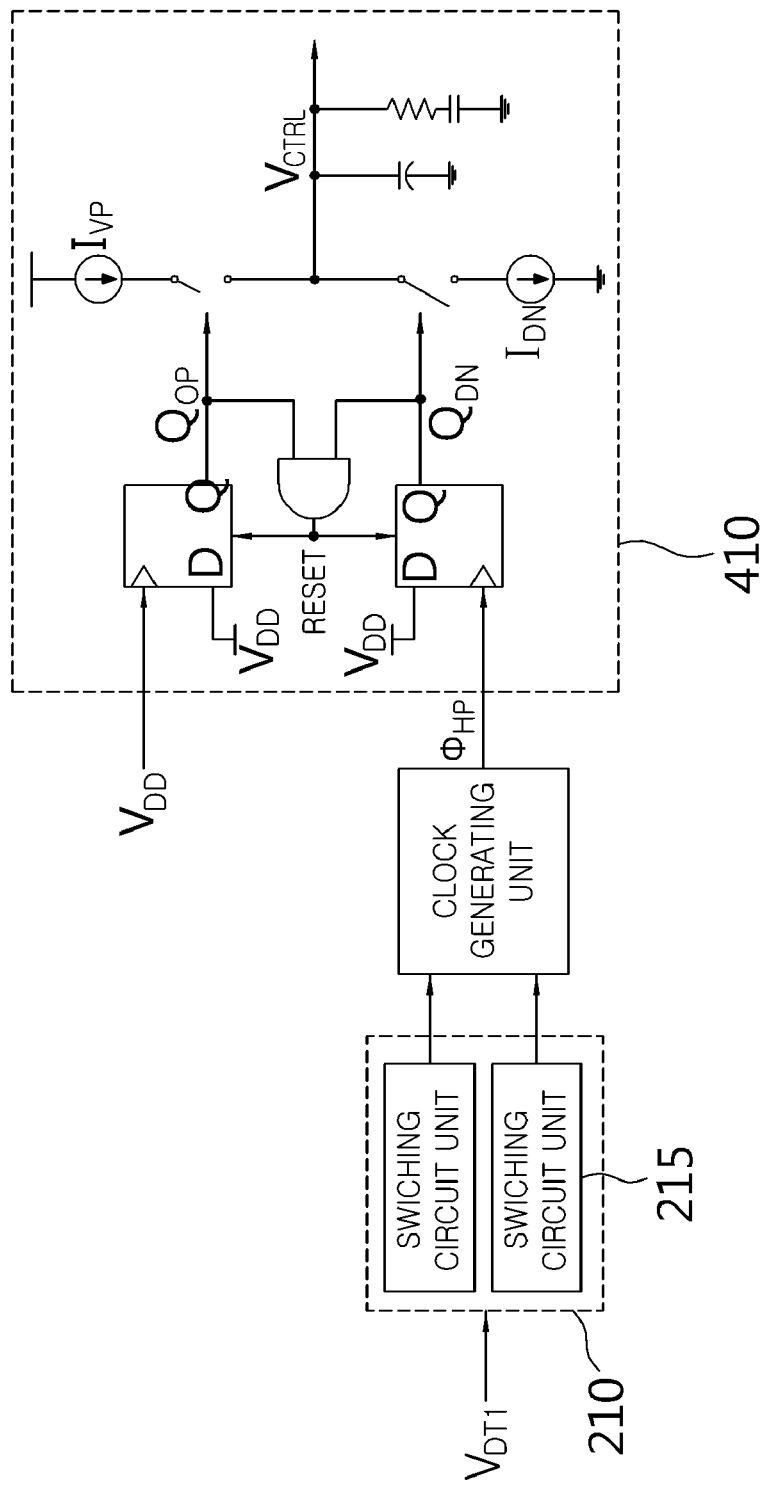
FIG. 4 is a diagram schematically illustrating an example of a phase shift circuit according to another embodiment of the present invention.

FIG. 4 is a diagram schematically illustrating a phase shift circuit including the control circuit unit described above.

Referring to FIG. 4, the switching circuit units 210 and 215 and the clock generating unit 220 described with reference to FIG. 2 may receive the voltage pulse signal $V_{DT1}$ corresponding to the current flowing in the inductor $L_1$ to generate the reference clock signal $\phi_{HP}$. The reference clock signal $\phi_{HP}$ may be transferred to a control circuit unit 410, and the control circuit unit 410 may generate a control signal $V_{CTRL}$ by using the reference clock signal $\phi_{HP}$ and the voltage pulse signal $V_{DT2}$ corresponding to the current flowing in the inductor $L_2$.

The control circuit unit 410 may include two D flip-flops receiving the reference clock signal $\phi_{HP}$ and the reference voltage $V_{DD}$ or the voltage pulse signal $V_{DT2}$ and the reference voltage $V_{DD}$, one AND gate, a current source, a switch, and the like. The control circuit unit 410 shown in FIG. 4 is only an example, and is not necessarily limited to having the above-mentioned form.

A level of the control signal $V_{CTRL}$ output by the control circuit unit 410 may be determined by output signals $\phi_{UP}$ and $\phi_{DN}$ of the D flip-flops, and the output signals $\phi_{UP}$ and $\phi_{DN}$ of the D flip-flops may be determined by the voltage pulse signal $V_{DT2}$ and the reference clock signal $\phi_{HP}$. Next, an operation of the control circuit unit 410 will be described with reference to both of the power factor correction circuit of FIG. 5 and the timing diagram of FIG. 6.

Figure 5:
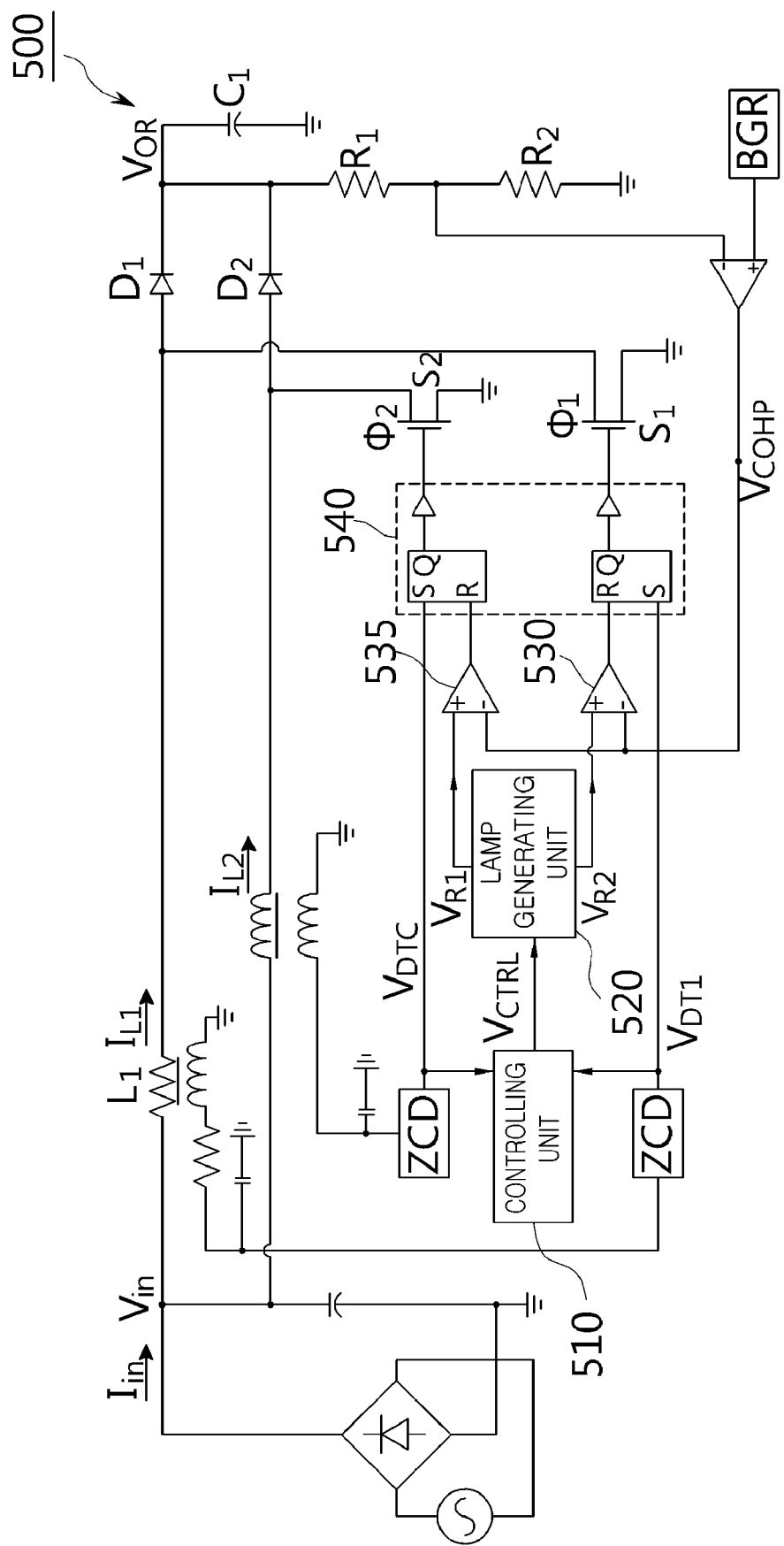
FIG. 5 is a circuit diagram illustrating an example of the power factor correction circuit according to the embodiment of the present invention.

FIG. 5 is a circuit diagram illustrating an example of the power factor correction circuit according to the embodiment of the present invention.

Referring to FIG. 5, the entire configuration of the power factor correction circuit 500 according to the present embodiment is similar to that of the power factor correction circuit 100 shown in FIG. 1. The power factor correction circuit 500 may have an interleaving structure in which two power factor correction circuits are connected to each other in parallel, and switches $S_1$ and $S_2$ respectively controlling operations of the power factor correction circuits are turned on or turned off by gate driving signals GDA and GDB. For convenience of explanation, it is assumed that a power factor correction circuit including an inductor $L_1$ and a switch $S_1$ is a main circuit and a power factor correction circuit including an inductor $L_2$ and a switch $S_2$ is a sub-circuit. That is, the main circuit including the inductor $L_1$ and the switch $S_1$ may perform a free-running operation regardless of an operation of the sub-circuit.

Currents of the inductors $L_1$ and $L_2$ may be detected in a zero-crossing scheme, and voltage pulse signals $V_{DT1}$ and $V_{DT2}$ may be generated. The voltage pulse signals $V_{DT1}$ and $V_{DT2}$ generated from the currents of the inductors may be transferred to a controlling unit 510, and the controlling unit 510 may output a control signal $V_{CTRL}$. The control signal $V_{CTRL}$ has the same meaning as that of the output control signal described above with reference to FIG. 4. That is, the controlling unit 510 may include a phase shift circuit. The control signal $V_{CTRL}$ may be transferred to a ramp generating unit 520, and the ramp generating unit 520 may generate first and second ramp signals $V_{R1}$ and $V_{R2}$.

The first and second ramp signals $V_{R1}$ and $V_{R2}$ may have a predetermined gradient. For example, the first ramp signal $V_{R1}$ may have a fixed gradient, and the second ramp signal $V_{R2}$ may have a variable gradient. In this case, the gradient of the second ramp signal may be determined according to a level of the control signal $V_{CTRL}$.

The first and second ramp signals $V_{R1}$ and $V_{R2}$ may be input to comparators 530 and 535, respectively, and be compared with a reference signal $V_{COMP}$, respectively. The reference signal $V_{COMP}$ may be obtained by comparing an output voltage of the power factor correction circuit with a band gap reference (BGR) signal. In an operation of the main circuit, $V_{COMP}$ may be compared with the first ramp signal $V_{R1}$, and the gate driving signal GDA may be determined according to a magnitude relationship therebetween. When the gate driving signal GDA drops to a low level and thus the switch $S_1$ is turned off, the current flowing in the inductor $L_1$ is decreased. When the current flowing in the inductor $L_1$ is decreased up to 0, a pulse may be generated in the voltage pulse signal $V_{DT1}$ by a current detecting unit 505, and an RS flip-flop 540 may output an output signal having a high level. As described above, the main circuit may perform the free-running operation regardless of the operation of the sub-circuit.

On the other hand, the gate driving signal GDB determining the operation of the sub-circuit may be determined by the ramp signal $V_{R2}$ having the variable gradient. $V_{R2}$ may be determined according to the level of the control signal $V_{CTRL}$, and the level of the control signal $V_{CTRL}$ may be controlled by a reference clock signal $\phi_{HP}$ output by the phase shift circuit included in the controlling unit 510. In addition, since the reference clock signal $\phi_{HP}$ is determined by the voltage pulse signal $V_{DT1}$ according to the current flowing in the inductor $L_1$ of the main circuit, an operation of the sub-circuit may be affected by the main circuit. Hereinafter, an operation of the sub-circuit and an operation of adjusting a phase of the gate driving signal GDB will be described with reference to a timing diagram of FIG. 6.

Figure 6:
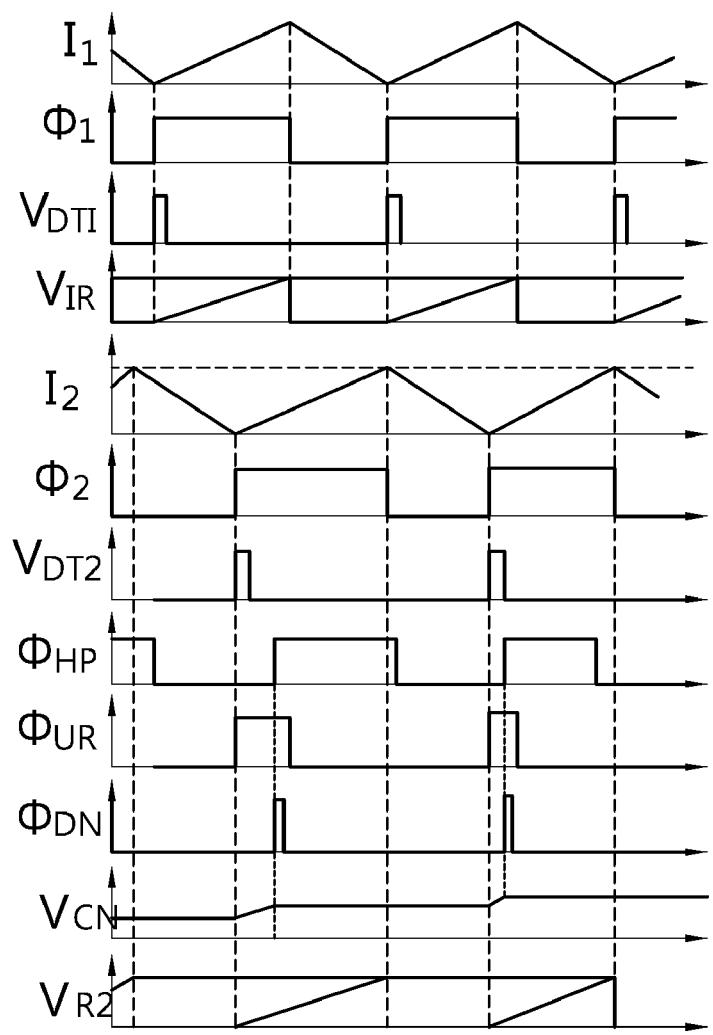
FIG. 6 is a timing diagram for describing an operation of the power factor correction circuit shown in FIG. 5.

FIG. 6 is a timing diagram for describing an operation of the power factor correction circuit shown in FIG. 5. First, the phase shift circuit of the controlling unit 510 may receive the voltage pulse signal $V_{DT1}$ determined from the current flowing in the inductor $L_1$ of the main circuit, as an input signal, as described with reference to FIGS. 2 through 4. In addition, as shown in the timing diagram of FIG. 3, a phase of the reference clock signal $\phi_{HP}$ may have a difference of 180 degrees from the voltage pulse signal $V_{DTS}$. Therefore, when the gate driving signal GDB is controlled so that a point in time at which the voltage pulse signal $V_{DT2}$ rises from a low level to a high level coincides with a point in time at which the reference clock signal $\phi_{HP}$ rises, a ripple component, an EMI component, and the like, of the input current may be significantly decreased.

First, in the case that a phase of the voltage pulse signal $V_{DT2}$ leads a phase of the reference clock signal $\phi_{HP}$, referring to the control circuit unit 410 shown in FIG. 4, the output signal $\phi_{DN}$ of the D flip-flop may have a low level, and the output signal $\phi_{UP}$ thereof may have a high level. Therefore, since a current is supplied from a current source $I_{UP}$, a level of the control signal $V_{CTRL}$ may rise, and the ramp generating unit 520 may decrease the gradient of the second ramp signal $V_{R2}$. That is, the second ramp signal $V_{R2}$ shows a tendency to be more slowly increased.

Since the second ramp signal $V_{R2}$ is slowly increased, the comparator 535 comparing the second ramp signal $V_{R2}$ with the reference signal $V_{COMP}$ may output a signal having a low level for a long period of time. As a result, the gate driving signal GDB is maintained at a high level for a long period of time, such that a turn-on time of the switch $S_2$ may be lengthened. Therefore, as shown in the timing diagram of FIG. 6, in the next period, the point in time at which the reference clock signal $\phi_{HP}$ rises and the point in time at which the voltage pulse signal $V_{DT2}$ rises may become close to each other. When the above-mentioned process is repeated several times, the point in time at which the reference clock signal $\phi_{HP}$ rises and the point in time at which the voltage pulse signal $V_{DT2}$ rises may coincide with each other.

To the contrary, when the phase of the voltage pulse signal $V_{DT2}$ lags behind the phase of the reference clock signal $\phi_{HP}$, the output signal $\phi_{DN}$ of the D flip-flop of the control circuit unit 410 may have a high level, and the output signal $\phi_{UP}$ thereof may have a low level, as opposed to the above-mentioned case. Therefore, the level of the control signal $V_{CTRL}$ drops, and the gradient of the second ramp signal $V_{R2}$ is increased, such that a turn-on time of the switch $S_2$ may be shortened. The above-mentioned operation is repeated several times, whereby the point in time at which the reference clock signal $\phi_{HP}$ rises and the point in time at which the voltage pulse signal $V_{DT2}$ rises may coincide with each other.

In the phase shift circuit according to the present embodiment described above with reference to FIGS. 1 through 6, the current sources outputting the currents having the same magnitude may be included in the switching circuit units 210 and 215. Therefore, matching characteristics between the current sources are excellent, and a separate state for setting an initial value of the ramp signal is not required, such that a phase difference due to a change in process, voltage, and temperature (PVT) conditions and a mismatch in a process may be decreased. In addition, the phase shift circuit according to the present embodiment may be widely applied to a technology of predicting how much the switching period progresses based on a period of the switching signal, as well as to the power factor correction circuit.

As set forth above, according to the embodiments of the present invention, a phase shift circuit capable of accurately controlling a phase difference between switching devices included in an interleaving-type power factor correction circuit to be a value of 360/n (n indicates the number of power factor correction circuits connected to one another in parallel) may be provided. Therefore, the ripple component and the EMI component included in the input current of the power factor correction circuit may be significantly decreased.

While the present invention has been shown and described in connection with the embodiments, it will be apparent to those skilled in the art that modifications and variations can be made without departing from the spirit and scope of the invention as defined by the appended claims.

What is claimed is:

1. A phase shift circuit comprising:
   a switching circuit unit charging power in or discharging power from a capacitor through a plurality of switching devices and comparing a voltage of the capacitor with a predetermined reference voltage; and
   a clock generating unit generating a reference clock signal based on an output of the switching circuit unit,
   wherein the switching circuit unit turns the plurality of switching devices on or off, based on currents from inductors respectively included in a main circuit and a sub-circuit of a power factor correction circuit to determine a polarity of the voltage of the capacitor,
   wherein the plurality of switching devices includes first and second switch groups having different operational timings, and a polarity of the voltage of the capacitor when the first switch group is turned on is different from a polarity of the voltage of the capacitor when the second switch group is turned on, and
   wherein the capacitor is charged both when the first switch group is on and when the second switch group is on.

2. The phase shift circuit of claim 1, wherein the switching circuit unit includes:
   at least one current source supplying charges to the capacitor; and
   at least one voltage source generating a voltage having the same level as that of the reference voltage.

3. The phase shift circuit of claim 1, further comprising a detection circuit unit detecting the currents of the inductors respectively included in the main circuit and the sub-circuit,
   wherein the switching circuit unit determines operations of the plurality of switching devices based on an output of the detection circuit unit.

4. The phase shift circuit of claim 3, wherein the clock generating unit generates the reference clock signal so as to have a phase difference of 180 degrees from a voltage pulse signal corresponding to the current of the inductor included in the main circuit.

5. The phase shift circuit of claim 3, wherein the detection circuit unit detects the currents of the inductors by a zero-crossing method.

6. The phase shift circuit of claim 1, further comprising a control circuit unit generating a control signal based on a voltage signal corresponding to the current of the inductor included in the sub-circuit and the reference clock signal,
   wherein the control circuit unit determines a level of the control signal by using a phase difference between the voltage signal corresponding to the current of the inductor included in the sub-circuit and the reference clock signal.

7. A power factor correction circuit comprising:
   a detection circuit unit detecting currents from inductors respectively included in a main circuit and a sub-circuit to generate a voltage pulse signal;
   a controlling unit generating a control signal based on the voltage pulse signal; and
   a driving circuit unit determining operations of switches respectively included in the main circuit and the sub-circuit, based on the control signal and the voltage pulse signal,
   wherein the controlling unit generates the control signal to allow driving signals for respectively operating the switch included in the main circuit and the switch included in the sub-circuit to have a phase difference therebetween so as to allow electromagnetic interference (EMI) to be significantly decreased,
   wherein the control signal generating circuit determines the level of the control signal from a phase difference between the reference clock signal and the voltage pulse signal, raises the level of the control signal when a phase of the voltage pulse signal generated from the current of the inductor included in the sub-circuit leads a phase of the reference clock signal, and lowers the level of the control signal when the phase of the voltage pulse signal generated from the current of the inductor included in the sub-circuit lags behind the phase of the reference clock signal.

8. The power factor correction circuit of claim 7, wherein the controlling unit includes:
   a phase shift circuit including a capacitor in or from which power is charged or discharged through a plurality of switching devices, and a clock generating circuit generating a reference clock signal by using a voltage of the capacitor; and
   a control signal generating circuit determining a level of the control signal based on the reference clock signal and the voltage pulse signal, the plurality of respective switching devices being turned on or turned off by the voltage pulse signal to determine a polarity of the voltage of the capacitor.

9. The power factor correction circuit of claim 7, wherein the clock generating circuit generates the reference clock signal so as to have a phase difference of 180 degrees from the voltage pulse signal generated from the current of the inductor included in the main circuit.

10. The power factor correction circuit of claim 7, wherein the detection circuit unit generates the voltage pulse signal by a zero-crossing method.

11. The power factor correction circuit of claim 7, wherein the driving circuit unit includes:
- a ramp generating unit generating a first ramp signal having a fixed gradient and a second ramp signal having a variable gradient from the control signal;
- a comparing circuit unit comparing the first and second ramp signals with a predetermined reference signal; and
- a flip-flop generating driving signals for the switches included in the main circuit and the sub-circuit, based on an output of the comparing circuit unit and the voltage pulse signal.

12. The power factor correction circuit of claim 11, wherein the comparing circuit unit compares an output signal of at least one of the main circuit and the sub-circuit with a band gap reference (BGR) signal to generate the reference signal.

* * * * *